United States Patent
Kim et al.

(10) Patent No.: US 12,162,766 B1
(45) Date of Patent: Dec. 10, 2024

(54) AEROGEL COMPOSITE

(71) Applicant: LG Chem, Ltd., Seoul (KR)

(72) Inventors: Mi Ri Kim, Daejeon (KR); Tae Gyeong Kang, Daejeon (KR); Kyoung Shil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/386,103

(22) Filed: Nov. 1, 2023

(30) Foreign Application Priority Data

Jun. 29, 2023 (KR) .................. 10-2023-0083943

(51) Int. Cl.
*C01B 33/158* (2006.01)
*C01B 33/143* (2006.01)
*C01B 33/154* (2006.01)

(52) U.S. Cl.
CPC ........ *C01B 33/1585* (2013.01); *C01B 33/143* (2013.01); *C01B 33/1546* (2013.01); *C01P 2006/10* (2013.01); *C01P 2006/16* (2013.01); *C01P 2006/32* (2013.01)

(58) Field of Classification Search
None
See application file for complete search history.

(56) References Cited

U.S. PATENT DOCUMENTS

| | | | |
|---|---|---|---|
| 2,734,827 A | 2/1956 | Hooks | |
| 7,560,062 B2 * | 7/2009 | Gould | B29C 43/222 516/111 |
| 10,759,666 B2 | 9/2020 | Hindelang et al. | |
| 11,577,490 B2 | 2/2023 | Oikawa et al. | |
| 2002/0094426 A1 | 7/2002 | Stepanian et al. | |
| 2010/0143717 A1 | 6/2010 | Sakamoto et al. | |
| 2016/0369059 A1 | 12/2016 | Kotake et al. | |
| 2017/0210092 A1 | 7/2017 | Rikleen et al. | |
| 2018/0134566 A1 | 5/2018 | Kim et al. | |
| 2018/0244029 A1 | 8/2018 | Kim et al. | |
| 2018/0313001 A1 | 11/2018 | Dempsey | |
| 2019/0062167 A1 | 2/2019 | Kim et al. | |
| 2020/0048100 A1 | 2/2020 | Yu et al. | |
| 2020/0108583 A1 * | 4/2020 | Oikawa | B32B 38/08 |
| 2020/0215791 A1 | 7/2020 | Oh et al. | |
| 2020/0378058 A1 * | 12/2020 | Oikawa | D06M 11/79 |
| 2021/0016239 A1 | 1/2021 | Kim et al. | |
| 2021/0309527 A1 | 10/2021 | Evans et al. | |
| 2021/0363699 A1 | 11/2021 | Afshari et al. | |
| 2021/0370636 A1 | 12/2021 | Tsuruta et al. | |
| 2022/0098046 A1 | 3/2022 | Lee et al. | |
| 2022/0195137 A1 | 6/2022 | Movahhed et al. | |
| 2023/0050685 A1 | 2/2023 | Kim et al. | |
| 2023/0348285 A1 | 11/2023 | Numrich et al. | |

FOREIGN PATENT DOCUMENTS

| | | |
|---|---|---|
| CN | 101680128 B | 1/2013 |
| CN | 107140938 A | 9/2017 |
| CN | 106565268 B | 1/2020 |
| CN | 113939942 A | 1/2022 |
| CN | 115748088 A | 3/2023 |
| CN | 116154360 A | 5/2023 |
| CN | 116945715 A | 10/2023 |
| JP | WO2017221687 A1 | 1/2019 |
| JP | 2020060291 A | 4/2020 |
| JP | 2021036038 A | 3/2021 |
| JP | 2022529347 A | 6/2022 |
| JP | 7285085 B2 | 6/2023 |
| JP | 7352769 B2 | 9/2023 |
| JP | 7368327 B2 | 10/2023 |
| KR | 100909732 B1 | 7/2009 |
| KR | 101281689 B1 | 7/2013 |
| KR | 20130138275 A | 12/2013 |
| KR | 20160125956 A | 11/2016 |
| KR | 101752091 B1 | 6/2017 |
| KR | 20170098141 A | 8/2017 |
| KR | 20170132829 A | 12/2017 |
| KR | 20180033064 A | 4/2018 |
| KR | 101911188 B1 | 10/2018 |
| KR | 101966406 B1 | 4/2019 |
| KR | 101993643 B1 | 6/2019 |
| KR | 20200073730 A | 6/2020 |
| KR | 20200095323 A | 8/2020 |
| KR | 102192354 B1 | 12/2020 |
| KR | 20210071508 A | 6/2021 |
| KR | 20210146798 A | 12/2021 |
| KR | 20220049841 A | 4/2022 |
| KR | 20220154727 A | 11/2022 |
| KR | 20220164499 A | 12/2022 |
| KR | 20230005300 A | 1/2023 |
| WO | 2018163354 A1 | 9/2018 |

OTHER PUBLICATIONS

Emmerling, A., and J. Fricke. "Small angle scattering and the structure of aerogels." Journal of non-crystalline solids 145 (Jan. 1992): 113-120. 8 pgs.

Jun-Jie Zhao, et al., "A 3-D numerical heat transfer model for silica aerogels based on the porous secondary nanoparticle aggregate structure", Journal of Non-Crystalline Solids,; vol. 358, Issue 10, (Mar. 2012), pp. 1287-1297.

Yan-Jun Dai, et al., "A Theoretical Model for the Effective Thermal Conductivity of Silica Aerogel Composites", Applied Thermal Engineering, (Sep. 2017). 29 pgs.

A Klochkov et al., "Pulse NMR of 3He in aerogel at temperature 1.5 K", Journal of Physics: Conference Series 150 (Feb. 2009) 032043. 5 pgs.

Jeong, Sangbae, et al., "Application of Silica Aerogel as an Interlayer Insulating Film", The Korean Ceramic Society, Ceramist, vol. 4, Issue 6, pp. 84-90, Dec. 2001.

* cited by examiner

*Primary Examiner* — Michael Forrest
(74) *Attorney, Agent, or Firm* — Lerner David LLP

(57) ABSTRACT

An aerogel composite maintains an excellent level of heat insulation even when compressed and deformed. The aerogel composite can be included in batteries, electronic devices, automobiles, industrial equipment, structures, or the like, as a heat insulation material.

18 Claims, No Drawings

AEROGEL COMPOSITE

CROSS-REFERENCE TO RELATED APPLICATION

This application claims priority to Korean Patent Application No. 10-2023-0083943 filed on Jun. 29, 2023, all of the contents of which is incorporated by reference in its entirety.

BACKGROUND

The present disclosure relates to an aerogel composite and the application use thereof as a heat insulation material.

An aerogel is a super-porous, high specific surface area (>500 m$^2$/g) material having a porosity of approximately 90.0% to 99.9% and a pore size in the range of 1 nm to 100 nm, and is a material having excellent properties ultra-light weight/super-heat insulation/ultra-low dielectric, and the like. Accordingly, research on the development of aerogel materials as well as research on the application use thereof as transparent insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantages of an aerogel are that it has super-insulation properties exhibiting a thermal conductivity of approximately 0.300 W/m-K or less, which is lower than that of a conventional organic heat insulation material such as Styrofoam, thereby solving the problems associated with the conventional organic heat insulation material, such as fire vulnerability and generation of harmful gases in case of a fire.

In general, an aerogel is produced by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional heat insulation material which prevents corrosion by moisture, and is widely used in construction or industrial fields, and in addition, the hydrophobic silica aerogel blanket may be used as a heat insulation material, thermal insulation material, or non-combustible material for aircraft, ships, automobiles, batteries, and the like. However, when the silica aerogel blanket is applied for the above uses, there have been problems in that when a pressurization environment is provided due to continuous thermal expansion of a device positioned adjacent thereto, or when a large pressure is applied from the surroundings during the installation of an aerogel heat insulation material, the aerogel structure collapses, so that the heat insulation properties are significantly reduced.

SUMMARY

The present disclosure provides an aerogel composite capable of maintaining constant heat insulation properties without significant degradation even when exposed to a pressurization environment.

However, the technical task to be achieved by the present disclosure is not limited to the aforementioned task, and other tasks that are not mentioned will be clearly understood by those skilled in the art from the following description.

In accordance with some embodiments of the present disclosure, an aerogel composite includes a fiber substrate, and an aerogel including one or more pores, wherein when the aerogel composite is compressed by application of pressure of any one of 24 bar, 30 bar, or 33 bar in a horizontal direction (transverse direction) with respect to a cross-section of the aerogel composite, the heat transmission coefficient after the compression is equal to or less than three times the heat transmission coefficient before the compression.

In some embodiments, when the aerogel composite is compressed by application of pressure of 24 bar, 30 bar, and 33 bar in the horizontal direction (transverse direction) with respect to the cross-section of the aerogel composite, the heat transmission coefficient after the compression may be equal to or less than three times the heat transmission coefficient before the compression.

When the aerogel composite is applied with a pressure of 3 bar in the horizontal direction (transverse direction) with respect to the cross-section of the aerogel composite, the heat transmission coefficient after the compression may be 1.45 times or less the heat transmission coefficient before the compression. In some embodiments, the heat transmission coefficient after the compression may be equal to or 1.45 times or less the heat transmission coefficient before the compression.

When the cross-section of the aerogel composite is applied with a pressure of 9 bar in the horizontal direction (transverse direction) with respect to the cross-section of the aerogel composite, the heat transmission coefficient after the compression may be equal to or less than 1.85 times the heat transmission coefficient before the compression. In some embodiments, the heat transmission coefficient after the compression may be equal to or 1.85 times or less the heat transmission coefficient before the compression.

When the cross-section of the aerogel composite is applied with a pressure of 15 bar in the horizontal direction (transverse direction) with respect to the cross-section of the aerogel composite, the heat transmission coefficient after the compression may be equal to or less than 2.35 times the heat transmission coefficient before the compression. In some embodiments, the heat transmission coefficient after the compression may be equal to or 2.35 times or less the heat transmission coefficient before the compression.

When the cross-section of the aerogel composite is applied with a pressure of at least one of 9 bar, 15 bar, 24 bar, 30 bar, or 33 bar in the horizontal direction (transverse direction) with respect to the cross-section of the aerogel composite, the compression recovery rate represented by Equation 1 below may be 60% or greater. In some embodiments, the compression recovery rate represented by Equation 1 below may be from 60% to 99%, 60% to 98%, 60% to 97%, 60% to 96%, or 60% to 95% when the cross-section of the aerogel composite is applied with a pressure of at least one of 9 bar, 15 bar, 24 bar, 30 bar, or 33 bar in the horizontal direction (transverse direction) with respect to the cross-section of the aerogel composite.

Compression recovery rate (%)={(Cross-sectional thickness of aerogel composite after compression)/(Cross-sectional thickness of aerogel composite before compression)}×100    [Equation 1]

The heat transmission coefficient obtained after compressing the aerogel composite with a pressure of at least one of 9 bar, 15 bar, 24 bar, or 30 bar may satisfy Equation 3 below.

(Heat transmission coefficient (a) after compression-Average value (b) of heat transmission coefficients after compression)=(Average value (*b*) of heat transmission coefficients after compression)×*A* [Equation 3]

In Equation 3 above, the heat transmission coefficient (a) after compression means the heat transmission coefficient obtained after compressing the aerogel composite with a pressure of any one pressure value of 9 bar, 15 bar, 24 bar, or 30 bar in the horizontal direction (transverse direction) with respect to the cross-section of the aerogel composite, the average value (b) of heat transmission coefficients after compression means the average value of heat transmission coefficients obtained after compressing the aerogel composite with a pressure of each pressure value of 9 bar, 15 bar, 24 bar, and 30 bar in the horizontal direction (transverse direction) with respect to the cross-section of the aerogel composite, and the A is a rational number of from −0.15 to +0.15.

A change rate (B) of heat transmission coefficient after compression per unit application pressure represented by Equation 4 below with respect to the aerogel composite may be a rational number of from −0.100 to +0.100.

*B*=(heat transmission coefficient after compression with *a* pressure of *x*−heat transmission coefficient after compression with *a* pressure of *y*)/(*x*−*y*) [Equation 4]

In Equation 4 above, x and y are independently any one pressure value (unit bar) of 9 bar, 15 bar, or 24 bar, and are different pressure values from each other.

The aerogel may include pores having a pore diameter of 30 nm or less at 30% to 45% of the pore volume of the framework structure. In some embodiments, the pore diameter is from 0.1 nm to 30 nm at 30% to 45% of the pore volume of the framework structure.

The aerogel composite may have a density ranging from 0.05 g/cm³ to 0.50 g/cm³.

In accordance with some embodiments of the present disclosure, a heat insulation member includes the aerogel composite provided in the present disclosure.

The heat insulation member may further include a support member positioned on at least one surface of an upper surface or a lower surface of the aerogel composite.

DETAILED DESCRIPTION

Terms and words used in the specification and claims shall not be construed as limited to ordinary or dictionary terms and should be construed in a sense and concept consistent with the technical idea of the present disclosure, based on the principle that an inventor may properly define the meaning of the words or terms in the best way possible to explain the invention.

In accordance with some embodiments of the present disclosure, an aerogel composite includes a fiber substrate, and an aerogel including one or more pores.

In the present disclosure, an "aerogel" includes a three-dimensional network structure in which a plurality of aerogel particles having a size of approximately 2 nm to 20 nm are agglomerated or combined to form a plurality of open pores.

In the present disclosure, an aerogel may be an inorganic silica aerogel formed from a silicon alkoxide-based compound or water glass as a precursor. In some embodiments, the aerogel may include silica, methylsilylated silica, dimethylsilylated silica, trimethylsilylated silica, or mixtures thereof. In some embodiments, the aerogel may be an aerogel in which at least portion of $SiO_2$ on a surface of a $SiO_2$ network has a bond structure Si—O—$SiO_2(CH_3)$, Si—O—$SiO(CH_3)_2$ or Si—O—$Si(CH_3)_3$. A process for producing an aerogel will be described in detail below.

In the present disclosure, the "aerogel particle" is a particle in the form of an individual solid unit constituting an aerogel, and may be powder, a bead, a fine powder material, a granule, a pellet, an agglomerate, a fiber, a flake, and the like, and the shape thereof may be spherical, hemispherical, circular, semicircular, polygonal, cubical, rodlike, polyhedral, irregular, and the like. In the present disclosure, the aerogel particles may have an average particle diameter of approximately 10 nm to 2,000 nm, 10 nm to 1,500 nm, or 10 nm to 1,000 nm, but are not limited thereto. In the present disclosure, the average particle size may be measured by any means known to those skilled in the art, such as scanning electron microscopy, dynamic light scattering, optical microscopy, size exclusion, or the like, but is not limited thereto.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In some embodiments, the aerogel of the present disclosure may include mesopores. In some embodiments, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In an aerogel, pores having a pore diameter of 30 nm or less are not destroyed or have a low destruction rate even when the aerogel is compressed by a high pressure (for example, a pressure of 37 bar or less, 33 bar or less, or 30 bar or less). Accordingly, in the present disclosure, by allowing pores having a pore diameter of 30 nm or less to be included in an aerogel at a predetermined ratio, the heat transmission coefficient of an aerogel composite may be maintained within a predetermined range even under a pressurization environment compared to that before the pressurization.

Specifically, in the present disclosure, the aerogel may include pores having a pore diameter of 30 nm or less, preferably from 0.1 nm to 30 nm at 25% or greater, 26% or greater, 27% or greater, 28% or greater, 29% or greater, 30% or greater, or 31% or greater of the pore volume of the skeletal structure, and may include the pores at 50% or less, 49% or less, 48% or less, 47% or less, 46% or less, 45% or less, 44% or less, 43% or less, 41% or less, or 40% or less, preferably 25% to 45%, 25% to 40%, 30% to 45%, or 30% to 40%, but is not limited thereto. In some embodiments, the aerogel may include pores having a pore diameter of 30 nm or less at 30% to 45%. In some embodiments, the aerogel may include pores having a pore diameter of from 0.1 nm to 30 nm at 30% to 45%.

In addition, in the present disclosure, the aerogel may include pores having a pore diameter of greater than 30 nm at 50% or greater, 51% or greater, 52% or greater, 53% or greater, 54% or greater, 55% or greater, 56% or greater, 57% or greater, 58% or greater, 59% or greater, or 60% or greater of the pore volume of the skeletal structure, and may include the pores at 75% or less, 74% or less, 73% or less, 72% or less, 71% or less, 70% or less, or 69% or less, preferably 55% to 75%, 60% to 75%, 55% to 70%, or 60% to 70%, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including a fiber, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil® (manufactured by Saffil), Durablanket® (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema® (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Gore-tex® (manufactured by W.L. GORE), a silicon carbide fiber such as NICALCON (manufactured by COI Ceramics), a ceramic fiber such as NEXTEL (manufactured by 3M), an acrylic polymer, wool, silk, hemp, leather, a suede fiber, a PBOfiber Zylon® (manufactured by Toyobo), a liquid crystal material such as VECTAN (manufactured by Hoechst), a cambrel fiber (manufactured by DuPont), polyurethane, polyamide, a wool fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance.

In the present disclosure, the thickness of the fiber substrate may be 0.5 nm to 20 mm, but is not limited thereto.

The aerogel composite provided in the present disclosure may be a mixture of a fiber substrate and an aerogel from the upper surface to the lower surface thereof, but is not limited thereto.

In addition, at least a portion of the upper surface or lower surface, preferably the entire surface of the aerogel composite provided in the present disclosure may have a flat shape. Here, the "flat shape" means that irregularities are not formed by an intentional embossing or coating process. In the present disclosure, by forming the upper and lower surfaces of the aerogel composite to be flat as described above, it is possible to increase the ease of work in stacking a support member such as a sheet on the surface of the upper and lower surfaces in the future, and increase the adhesion retention rate of the support member. In addition, even if the aerogel composite itself is directly applied as a heat insulation member without a support member, it is preferable in terms of reducing frictional force with the surface of a device positioned adjacent thereto.

The aerogel composite provided in the present disclosure has excellent elasticity, flexibility, and strength, and thus, has excellent elastic recovery force even when the aerogel composite is compressed and deformed under a pressurization environment, and may maintain a high level of heat insulation properties.

In the present disclosure, the density of the aerogel composite may be 0.05 g/cm$^3$ to 0.50 g/cm$^3$, 0.05 g/cm$^3$ to 0.35 g/cm$^3$, 0.05 g/cm$^3$ to 0.30 g/cm$^3$, 0.10 g/cm$^3$ to 0.30 g/cm$^3$, or 0.15 g/cm$^3$ to 0.30 g/cm$^3$, but is not limited thereto.

In the present disclosure, when the aerogel composite is applied with a pressure of 1 bar or greater, 2 bar or greater, 3 bar or greater, 4 bar or greater, 5 bar or greater, 6 bar or greater, 7 bar or greater, 8 bar or greater, 9 bar or greater, 10 bar or greater, 15 bar or greater, 20 bar or greater, 25 bar or greater, 30 bar or greater, 35 or greater, or 40 bar or greater, and 50 bar or less, 45 bar or less, 40 bar or less, 35 bar or less, 30 bar or less, 25 bar or less, 20 bar or less, 15 bar or less, 10 bar or less, 9 bar or less, 8 bar or less, 7 bar or less, 6 bar or less, 5 bar or less, 4 bar or less, 3 bar or less, or 2 bar or less in the horizontal direction (transverse direction) with respect to the cross-section of the aerogel composite, the compression recovery rate may be 45% or greater, 50% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In the present disclosure, as shown in Equation 1 below, the "compression recovery rate" means the percentage of the cross-sectional thickness of the aerogel composite after a predetermined time has elapsed after compression compared to the cross-sectional thickness of the aerogel composite before the compression. Here, the predetermined time may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, 2 hours or more, 4 hours or more, 6 hours or more, 8 hours or more, 10 hours or more, 12 hours or more, 24 hours or more, 48 hours or more, or 96 hours or more, but is not limited thereto.

Compression recovery rate (%)={(Cross-sectional thickness of aerogel composite after compression)/(Cross-sectional thickness of aerogel composite before compression)}×100    [Equation 1]

In the present disclosure, the "pressure" value means the value of a pressure actually applied to a unit area of the aerogel composite when a pressure is applied in the horizontal direction (transverse direction) with respect to the cross-section of the aerogel composite using a press device or the like. In some embodiments, when a pressure is applied in the horizontal direction (transverse direction) with respect to the cross-section of the aerogel composite using a press device including a cylinder, the actual pressure value may mean, as shown in Equation 2 below, a value obtained by dividing the product of a cross-sectional area of the cylinder and a set pressure value by the area of a specimen, but is not limited thereto, and may be calculated differently depending on each device or as set by a manufacturer.

Actual pressure value=(Radius (cm) of inner diameter of cylinder of press equipment×Radius (cm) of inner diameter of cylinder of press equipment×3.14×set pressure value)/(Area of specimen(cm$^2$)) [Equation 2]

In the present disclosure, the time during which a pressure is applied to the aerogel composite is not particularly limited, but may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, or 2 hours or more, and 24 hours or less, 12 hours or less, 10 hours or less, 8 hours or less, 6 hours or less, 4 hours or less, 2 hours or less, 1 hour or less, 50 minutes or less, 40 minutes or less, 30 minutes or less, 20 minutes or less, 10 minutes or less, 5 minutes or less, 1 minute or less, 30 seconds or less, 10 seconds or less, or 5 seconds or less, but is not limited thereto.

In the present disclosure, applying a pressure in a horizontal direction (transverse direction) with respect to a cross-section of an aerogel composite means applying a pressure to the aerogel composite in a direction from an upper surface to lower surface of the aerogel composite or in a direction from the lower surface to the upper surface, i.e., in a thickness direction.

In some embodiments, in the present disclosure, when the aerogel composite is applied with a pressure of 3 bar or greater in the horizontal direction (transverse direction) with respect to the cross-section of the aerogel composite, the compression recovery rate may be 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In some embodiments, in the present disclosure, when the aerogel composite is applied with a pressure of 5 bar or greater, 10 bar or greater, 15 bar or greater, 20 bar or greater, 25 bar or greater, 30 bar or greater, or 35 bar or greater in the horizontal direction (transverse direction) with respect to the cross-section of the aerogel composite, the compression recovery rate may be 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In some embodiments, in the present disclosure, when the aerogel composite is applied with a pressure of 3 bar in the horizontal direction (transverse direction) with respect to the cross-section of the aerogel composite, the compression recovery rate may be 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 80% or greater, 82% or greater, 84% or greater, 86% or greater, 88% or greater, 90% or greater, or 92% or greater.

In some embodiments, in the present disclosure, when the aerogel composite is applied with a pressure of 9 bar in the horizontal direction (transverse direction) with respect to the cross-section of the aerogel composite, the compression recovery rate may be 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 70% or greater, 72% or greater, 74% or greater, 76% or greater, or 78% or greater.

In some embodiments, in the present disclosure, when the aerogel composite is applied with a pressure of 15 bar in the horizontal direction (transverse direction) with respect to the cross-section of the aerogel composite, the compression recovery rate may be 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 70% or greater, 72% or greater, 74% or greater, or 76% or greater.

In some embodiments, in the present disclosure, when the aerogel composite is applied with a pressure of 24 bar in the horizontal direction (transverse direction) with respect to the cross-section of the aerogel composite, the compression recovery rate may be 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 70% or greater, 72% or greater, 74% or greater, or 76% or greater.

In some embodiments, in the present disclosure, when the aerogel composite is applied with a pressure of 30 bar in the horizontal direction (transverse direction) with respect to the cross-section of the aerogel composite, the compression recovery rate may be 53% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 68% or greater, 70% or greater, 72% or greater, 74% or greater, or 76% or greater.

In some embodiments, in the present disclosure, when the aerogel composite is applied with a pressure of 33 bar in the horizontal direction (transverse direction) with respect to the cross-section of the aerogel composite, the compression recovery rate may be 53% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 68% or greater, 70% or greater, 72% or greater, 74% or greater, or 76% or greater.

In some embodiments, in the present disclosure, when the aerogel composite is applied with a pressure of 37 bar in the horizontal direction (transverse direction) with respect to the cross-section of the aerogel composite, the compression recovery rate may be 50% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, and more preferably 55% or greater, 60% or greater, or 62% or greater.

In the present disclosure, the thickness of the aerogel composite before compression may be 20 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, or 1 mm or less, and 0.5 mm or greater, 1 mm or greater, or 2 mm or greater, and the thickness may be suitably adjusted by adjusting the thickness of a substrate or the amount of aerogel sol impregnated into the substrate according to the application use of the aerogel composite.

In the present disclosure, when the aerogel composite is applied with a pressure of 1 bar or greater, 2 bar or greater, 3 bar or greater, 4 bar or greater, 5 bar or greater, 6 bar or greater, 7 bar or greater, 8 bar or greater, 9 bar or greater, 10 bar or greater, 15 bar or greater, 20 bar or greater, 25 bar or greater, 30 bar or greater, 35 or greater, or 40 bar or greater, and 50 bar or less, 45 bar or less, 40 bar or less, 35 bar or less, 30 bar or less, 25 bar or less, 20 bar or less, 15 bar or less, 10 bar or less, 9 bar or less, 8 bar or less, 7 bar or less, 6 bar or less, 5 bar or less, 4 bar or less, 3 bar or less, or 2 bar or less in the horizontal direction (transverse direction) with respect to the cross-section of the aerogel composite, the heat transmission coefficient after the compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, and additionally, 1 time or greater, or greater than 1 time the heat transmission coefficient before the compression.

In the present disclosure, the "heat transmission coefficient refers to the transfer of heat from an air layer to an air layer through a solid object, and means the amount of heat flowing when a cross-sectional area of 1 $m^2$ is at a temperature difference of 1° C. per unit time, which is a value obtained by dividing the thermal conductivity of an object by the thickness of the object. The amount of heat transfer of an object is affected by the thermal conductivity and thickness of the object, and the greater the thermal conductivity and the thinner the thickness, the greater the amount of heat transfer. Therefore, in order to achieve good heat insulation performance, the thermal conductivity is required to be small and the thickness is required to be large. However, when a pressure is applied to an elastic object, such as an aerogel composite, the thermal conductivity may change after the pressurization, and the thickness may also change. That is, unless the object is a completely elastic material, the thickness thereof inevitably decreases after the pressurization, but if the thermal conductivity does not change, the total amount of heat transfer increases due to the thickness reduction. That is, it is inevitable that the heat insulation performance will be degraded. Therefore, whether the heat insulation performance is maintained after the pressurization is not confirmed only with the thermal conductivity after the pressurization, but confirmed with the heat transmission coefficient, which considers both the thermal conductivity after pressurization and the thickness after pressurization. Even if the thermal conductivity decreases or is maintained after pressurization, if the thickness is significantly reduced after the pressurization, the heat transmission coefficient and the total amount of heat transfer inevitably increase significantly.

The aerogel composite provided in the present disclosure does not change significantly in both thermal conductivity and thickness even after pressurization, so that the increase rate of heat transmission coefficient compared to that before the pressurization is not high, and the heat insulation performance may be maintained at an excellent level without significant degradation even after the pressurization.

In the present disclosure, the "heat transmission coefficient after compression" means the ratio of thermal conductivity to a cross-sectional thickness of an aerogel composite measured after a predetermined time has elapsed after performing compression by applying a specific level of pressure to the aerogel composite in a horizontal direction (transverse direction) with respect to a cross-section of the aerogel composite. Here, the predetermined time may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 60 minutes or more, 2 hours or more, 4 hours or more, 6 hours or more, 8 hours or more, 10 hours or more, 12 hours or more, 24 hours or more, 48 hours or more, or 96 hours or more, but is not limited thereto.

In the present disclosure, the time during which a pressure is applied to the aerogel composite is not particularly limited, but may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, or 2 hours or more, and 24 hours or less, 12 hours or less, 10 hours or less, 8 hours or less, 6 hours or less, 4 hours or less, 2 hours or less, 1 hour or less, 50 minutes or less, 40 minutes or less, 30 minutes or less, 20 minutes or less, 10 minutes or less, 5 minutes or less, 1 minute or less, 30 seconds or less, 10 seconds or less, or 5 seconds or less, but is not limited thereto.

In some embodiments, in the present disclosure, when the aerogel composite is applied with a pressure of 3 bar or greater, 5 bar or greater, 10 bar or greater, 15 bar or greater, 20 bar or greater, 25 bar or greater, 30 bar or greater, or 35 bar or greater in the horizontal direction (transverse direction) with respect to the cross-section of the aerogel composite, the heat transmission coefficient after the compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before the compression.

In some embodiments, in the present disclosure, when the aerogel composite is applied with a pressure of any one pressure value of 9 bar to 33 bar in the horizontal direction (transverse direction) with respect to the cross-section of the aerogel composite, the heat transmission coefficient after the compression may be 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before the compression.

In some embodiments, in the present disclosure, when the aerogel composite is applied with a pressure of any one pressure value of 15 bar to 33 bar in the horizontal direction (transverse direction) with respect to the cross-section of the aerogel composite, the heat transmission coefficient after the compression may be 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less the heat transmission coefficient before the compression.

In some embodiments, in the present disclosure, when the aerogel composite is applied with a pressure of any one pressure value of 15 bar to 30 bar in the horizontal direction (transverse direction) with respect to the cross-section of the aerogel composite, the heat transmission coefficient after the compression may be 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less the heat transmission coefficient before the compression.

In some embodiments, in the present disclosure, when the aerogel composite is applied with a pressure of any one pressure value of 24 bar to 33 bar in the horizontal direction (transverse direction) with respect to the cross-section of the aerogel composite, the heat transmission coefficient after the compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before the compression.

In some embodiments, in the present disclosure, when the aerogel composite is applied with a pressure of any one pressure value of 24 bar to 30 bar in the horizontal direction (transverse direction) with respect to the cross-section of the aerogel composite, the heat transmission coefficient after the compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before the compression.

In some embodiments, in the present disclosure, when the aerogel composite is applied with a pressure of any one pressure value of 30 bar to 33 bar in the horizontal direction (transverse direction) with respect to the cross-section of the aerogel composite, the heat transmission coefficient after the compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before the compression.

In some embodiments, in the present disclosure, when the aerogel composite is applied with a pressure of 3 bar in the horizontal direction (transverse direction) with respect to the cross-section of the aerogel composite, the heat transmission coefficient after the compression may be 1.45 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 1.2 times or less, 1.1 times or less, 1.05 times or less, 1.04 times or less, 1.03 times or less, 1.02 times or less, or 1.01 times or less the heat transmission coefficient before the compression.

In some embodiments, when the aerogel composite is applied with a pressure of 3 bar in the horizontal direction (transverse direction) with respect to the cross-section of the aerogel composite, the heat transmission coefficient after the compression may be 1.45 times or less the heat transmission coefficient before the compression along the transverse direction. In some embodiments, when the aerogel composite is applied with a pressure of 3 bar in the horizontal direction (transverse direction) with respect to the cross-section of the aerogel composite, the heat transmission coefficient after the compression may be equal to or 1.45 times or less the heat transmission coefficient before the compression along the transverse direction. In some embodiments, when the aerogel composite is applied with a pressure of 3 bar in the horizontal direction (transverse direction) with respect to the cross-section of the aerogel composite, the heat transmission coefficient after the compression may be greater than or 1.45 times or less the heat transmission coefficient before the compression along the transverse direction.

In some embodiments, in the present disclosure, when the aerogel composite is applied with a pressure of 9 bar in the horizontal direction (transverse direction) with respect to the cross-section of the aerogel composite, the heat transmission coefficient after the compression may be 1.85 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before the compression.

In some embodiments, when the aerogel composite is applied with a pressure of 9 bar in the horizontal direction (transverse direction) with respect to the cross-section of the aerogel composite, the heat transmission coefficient after the compression may be 1.85 times or less the heat transmission coefficient before the compression along the transverse direction. In some embodiments, when the aerogel composite is applied with a pressure of 9 bar in the horizontal direction (transverse direction) with respect to the cross-section of the aerogel composite, the heat transmission coefficient after the compression may be equal to or 1.85 times or less the heat transmission coefficient before the compression along the transverse direction. In some embodiments, when the aerogel composite is applied with a pressure of 9 bar in the horizontal direction (transverse direction) with respect to the cross-section of the aerogel composite, the heat transmission coefficient after the compression may be greater than or 1.85 times or less the heat transmission coefficient before the compression along the transverse direction.

In some embodiments, in the present disclosure, when the aerogel composite is applied with a pressure of 15 bar in the horizontal direction (transverse direction) with respect to the cross-section of the aerogel composite, the heat transmission coefficient after the compression may be 2.35 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less, and more preferably 1.7 times or less, 1.6 times or less, 1.5 times or less, 1.4 times or less, 1.3 times or less, 1.2 times or less, or 1.1 times or less the heat transmission coefficient before the compression.

In some embodiments, when the aerogel composite is applied with a pressure of 15 bar in the horizontal direction (transverse direction) with respect to the cross-section of the aerogel composite, the heat transmission coefficient after the compression along the transverse direction may be equal to or 2.35 times or less the heat transmission coefficient before the compression along the transverse direction. In some embodiments, when the aerogel composite is applied with a pressure of 15 bar in the horizontal direction (transverse direction) with respect to the cross-section of the aerogel composite, the heat transmission coefficient after the compression may be equal to or 2.35 times or less the heat transmission coefficient before the compression along the transverse direction. In some embodiments, when the aerogel composite is applied with a pressure of 15 bar in the horizontal direction (transverse direction) with respect to the cross-section of the aerogel composite, the heat transmission coefficient after the compression may be greater than or 2.35 times or less the heat transmission coefficient before the compression along the transverse direction.

In some embodiments, in the present disclosure, when the aerogel composite is applied with a pressure of 24 bar in the horizontal direction (transverse direction) with respect to the cross-section of the aerogel composite, the heat transmission coefficient after the compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2.3 times or less, 2.2 times or less, 2.1 times or less, 2 times or less, 1.9 times or less, 1.8 times or less, 1.7 times or less 1.6 times or less, 1.5 times or less, 1.4 times or less, 1.3 times or less, 1.2 times or less, 1.1 times or less, or 1.05 times or less, and more preferably 1.7 times or less, 1.6 times or less, 1.5 times or less, 1.4 times or less, 1.3 times or less, 1.2 times or less, or 1.1 times or less the heat transmission coefficient before the compression.

In some embodiments, when the aerogel composite is applied with a pressure of 24 bar in the horizontal direction (transverse direction) with respect to the cross-section of the aerogel composite, the heat transmission coefficient after the compression along the transverse direction may be equal to or 2.7 times or less the heat transmission coefficient before the compression along the transverse direction. In some embodiments, when the aerogel composite is applied with a pressure of 24 bar in the horizontal direction (transverse direction) with respect to the cross-section of the aerogel composite, the heat transmission coefficient after the compression may be equal to or 2.7 times or less the heat transmission coefficient before the compression along the transverse direction. In some embodiments, when the aerogel composite is applied with a pressure of 24 bar in the horizontal direction (transverse direction) with respect to the cross-section of the aerogel composite, the heat transmission coefficient after the compression may be greater than or 2.7 times or less the heat transmission coefficient before the compression along the transverse direction.

In some embodiments, in the present disclosure, when the aerogel composite is applied with a pressure of 30 bar in the horizontal direction (transverse direction) with respect to the cross-section of the aerogel composite, the heat transmission coefficient after the compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2.3 times or less, 2.2 times or less, 2.1 times or less, 2 times or less, 1.9 times or less, 1.8 times or less, 1.7 times or less 1.6 times or less, 1.5 times or less, 1.4 times or less, 1.3 times or less, 1.2 times or less, 1.1 times or less, or 1.05 times or less, and more preferably 1.7 times or less, 1.6 times or less, 1.5 times or less, 1.4 times or less, 1.3 times or less, 1.2 times or less, or 1.1 times or less the heat transmission coefficient before the compression.

In some embodiments, when the aerogel composite is applied with a pressure of 30 bar in the horizontal direction (transverse direction) with respect to the cross-section of the aerogel composite, the heat transmission coefficient after the compression in the transverse direction may be equal to or 3 times or less the heat transmission coefficient before the compression along the transverse direction. In some embodiments, when the aerogel composite is applied with a pressure of 30 bar in the horizontal direction (transverse direction) with respect to the cross-section of the aerogel composite, the heat transmission coefficient after the compression may be equal to or 3 times or less the heat transmission coefficient before the compression along the transverse direction. In some embodiments, when the aerogel composite is applied with a pressure of 30 bar in the horizontal direction (transverse direction) with respect to the cross-section of the aerogel composite, the heat transmission coefficient after the compression may be greater than or 3 times or less the heat transmission coefficient before the compression along the transverse direction.

In some embodiments, in the present disclosure, when the aerogel composite is applied with a pressure of 33 bar in the horizontal direction (transverse direction) with respect to the cross-section of the aerogel composite, the heat transmission coefficient after the compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2.3 times or less, 2.2 times or less, 2.1 times or less, 2 times or less, 1.9 times or less, 1.8 times or less, 1.7 times or less 1.6 times or less, 1.5 times or less, 1.4 times or less, 1.3 times or less, 1.2 times or less, or 1.1 times or less, and more preferably 2.0 times or less, 1.9 times or less, 1.8 times or less, 1.7 times or less, 1.6 times or less, 1.5 times or less, 1.4 times or less, 1.3 times or less, or 1.2 times or less the heat transmission coefficient before the compression.

In some embodiments, when the aerogel composite is applied with a pressure of 33 bar in the horizontal direction (transverse direction) with respect to the cross-section of the aerogel composite, the heat transmission coefficient after the compression along the transverse direction may be equal to or 3 times or less the heat transmission coefficient before the compression along the transverse direction. In some embodiments, when the aerogel composite is applied with a pressure of 33 bar in the horizontal direction (transverse direction) with respect to the cross-section of the aerogel composite, the heat transmission coefficient after the compression may be equal to or 3 times or less the heat transmission coefficient before the compression along the transverse direction. In some embodiments, when the aerogel composite is applied with a pressure of 33 bar in the horizontal direction (transverse direction) with respect to the cross-section of the aerogel composite, the heat transmission coefficient after the compression may be greater than or 3 times or less the heat transmission coefficient before the compression along the transverse direction.

In the present disclosure, when a recovery rate or heat transmission coefficient after compression is measured using a press device or the like as described above, the measurement may be performed by preparing a single specimen from an aerogel composite; however, in the case where the size in width or length of an aerogel composite is smaller than a pressure applying portion of measurement equipment, measurement values of the compression recovery rate or heat transmission coefficient are presumed to be substantially the same as those obtained from a single specimen even if the compression recovery rate or heat transmission coefficient is measured after cutting the aerogel composite into two or more pieces and re-arranging the pieces so that both the width and length thereof are larger than the pressure applying equipment.

In some embodiments, in the present disclosure, the recovery rate after compression or heat transmission coefficient after compression may be measured with respect to a rectangular aerogel composite specimen having a size of 20 cm×20 cm in width and length. Here, if the size in width or length of the produced aerogel composite is less than 20 cm two or more specimens may be re-arranged side by side so that the size of the specimens becomes 20 cm×20 cm, and thereafter measurement may be performed with respect to the specimens.

Even when the aerogel composite provided in the present disclosure is pressurized (or compressed) with a pressure of any intensity, the heat transmission coefficient is maintained within a specific range after the compression, so that the heat insulation performance may be maintained at an excellent level without significant degradation.

Specifically, the heat transmission coefficient obtained after compressing the aerogel composite of the present disclosure with a pressure of at least one pressure value of 9 bar to 30 bar may satisfy Equation 3 below.

$$(\text{Heat transmission coefficient } (a) \text{ after compression} - \text{Average value } (b) \text{ of heat transmission coefficients after compression}) = (\text{Average value } (b) \text{ of heat transmission coefficients after compression}) \times A \quad [\text{Equation 3}]$$

In Equation 3 above, the heat transmission coefficient (a) after compression means the heat transmission coefficient obtained after performing compression with a pressure of at least one pressure value in the range of 9 bar to 30 bar in the horizontal direction (transverse direction) with respect to the cross-section of the aerogel composite, and as an example, may mean the heat transmission coefficient obtained after performing compression by applying a pressure of 9 bar, 15 bar, 24 bar, or 30 bar.

In addition, the average value (b) of heat transmission coefficients after compression means the average value of heat transmission coefficients obtained after performing compression with a pressure of at least two pressure values in the range of 9 bar to 30 bar in the horizontal direction (transverse direction) with respect to the cross-section of the aerogel composite, and as an example, may mean the average value of heat transmission coefficients obtained after performing compression by applying a pressure of each of 9 bar, 15 bar, 24 bar, and 30 bar.

The A may be a rational number of from −0.15 to +0.15, a rational number of from −0.14 to +0.14, a rational number of from −0.13 to +0.13, a rational number of from −0.12 to +0.12, a rational number of from −0.11 to +0.11, or a rational number of from −0.10 to +0.10.

In some embodiments, the heat transmission coefficient obtained after compressing the aerogel composite of the present disclosure with a pressure of 9 bar, 15 bar, 24 bar, or 30 bar may satisfy Equation 3 above. At this time, in Equation 3 above, the heat transmission coefficient (a) after compression may mean the heat transmission coefficient obtained after performing compression with a pressure of a pressure value of 9 bar, 15 bar, 24 bar, or 30 bar in the horizontal direction (transverse direction) with respect to the cross-section of the aerogel composite, and the average value (b) of heat transmission coefficients after compression may mean the average value of heat transmission coefficients obtained after performing compression with a pressure of any two pressure values of 9 bar, 15 bar, 24 bar, and 30 bar in the horizontal direction (transverse direction) with respect to the cross-section of the aerogel composite.

In some embodiments, the heat transmission coefficient obtained after compressing the aerogel composite of the present disclosure with a pressure of each of 9 bar, 15 bar, 24 bar, and 30 bar may satisfy Equation 3 above. At this time, in Equation 3 above, the heat transmission coefficient (a) after compression may mean the heat transmission coefficient obtained after performing compression with a pressure of any one pressure value of 9 bar, 15 bar, 24 bar, or 30 bar in the horizontal direction (transverse direction) with respect to the cross-section of the aerogel composite, and the average value (b) of heat transmission coefficients after compression may mean the average value of heat transmission coefficients obtained after performing compression with a pressure of each pressure value of 9 bar, 15 bar, 24 bar, and 30 bar in the horizontal direction (transverse direction) with respect to the cross-section of the aerogel composite.

In addition, a change rate (B) of heat transmission coefficient after compression per unit application pressure represented by Equation 4 below with respect to the aerogel composite of the present disclosure may be a rational number of −0.100 or greater, −0.09 or greater, −0.08 or greater, −0.07 or greater, −0.06 or greater, −0.05 or greater, −0.04 or greater, −0.03 or greater, −0.02 or greater, or −0.01 or greater, and may be a rational number of +0.100 or less, +0.09 or less, +0.08 or less, +0.07 or less, +0.06 or less, +0.05 or less, +0.04 or less, +0.03 or less, +0.02 or less, or +0.01 or less. Preferably, the change rate (B) may be a rational number of from −0.10 to +0.10, a rational number of from −0.09 to +0.09, a rational number of from −0.08 to +0.08, a rational number of from −0.07 to +0.07, a rational number of from −0.06 to +0.06, or a rational number of from −0.05 to +0.05.

$$B=(\text{heat transmission coefficient after compression with a pressure of } x - \text{heat transmission coefficient after compression with a pressure of } y)/(x-y) \quad \text{[Equation 4]}$$

In Equation 4 above, x and y are independently any one pressure value (unit bar) in the pressure range of 9 bar to 24 bar, and are different pressure values from each other.

In some embodiments, in Equation 4 above, x and y may independently be any one pressure value of 9 bar, 15 bar, or 24 bar.

In some embodiments, in Equation 4 above, x may be 24 bar, and y may be 9 bar.

In some embodiments, in Equation 4 above, x may be 15 bar, and y may be 9 bar.

In some embodiments, in Equation 4 above, x may be 24 bar, and y may be 15 bar.

In addition, in the present disclosure, the aerogel composite may satisfy Equation 5 below.

$$\text{Heat transmission coefficient } (a) \text{ after compression} = \text{Average value } (b) \text{ of heat transmission coefficients after compression} \times C \quad \text{[Equation 5]}$$

In Equation 5 above, the "heat transmission coefficient (a) after compression" means the heat transmission coefficient obtained after performing compression with a pressure of 9 bar, 15 bar, 24 bar, or 30 bar in the horizontal direction (transverse direction) with respect to the cross-section of the aerogel composite, the "average value (b) of heat transmission coefficients after compression" means the average value of heat transmission coefficients obtained after performing compression with a pressure of each of 9 bar, 15 bar, 24 bar, and 30 bar in the horizontal direction (transverse direction) with respect to the cross-section of the aerogel composite, and the C may be a rational number of from 0.85 to 1.12, a rational number of from 0.85 to 1.10, a rational number of from 0.90 to 1.12, a rational number of from 0.85 to 1.10, a rational number of from 0.90 to 1.10, or a rational number of from 0.90 to 1.05.

In some embodiments, in Equation 5 above, the heat transmission coefficient (a) after compression is the heat transmission coefficient obtained after performing compression with a pressure of 9 bar in the horizontal direction (transverse direction) with respect to the cross-section of the aerogel composite, wherein the C may be a rational number of from 0.85 to 1.12, a rational number of from 0.90 to 1.12, a rational number of from 0.85 to 1.10, a rational number of from 0.90 to 1.10, a rational number of from 0.85 to 1.0, or a rational number of from 0.90 to 1.0.

In some embodiments, in Equation 5 above, the heat transmission coefficient (a) after compression is the heat transmission coefficient obtained after performing compression with a pressure of 30 bar in the horizontal direction (transverse direction) with respect to the cross-section of the aerogel composite, wherein the C may be a rational number of from 0.90 to 1.12, a rational number of from 0.95 to 1.12, a rational number of from 0.90 to 1.10, a rational number of from 0.95 to 1.10, a rational number of from 1.0 to 1.12, or a rational number of from 1.0 to 1.10.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a specimen according to the ASTM D638 standard.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present disclosure may include any aerogel formed by any associated preparation method known to those skilled in the art.

Preparation of Silica Sol

In the present disclosure, a silica precursor composition and a catalyst composition may be mixed to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include silicate including a hydrophobic group. In the present disclosure, the type of the silicate including a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, when the silicate including the hydrophobic group is included in the silica precursor composition, the silicate including the hydrophobic group and the tetraalkyl silicate may be included in a molar ratio (molar ratio of silicate including a hydrophobic group:tetraalkyl silicate) of 2:98 to 98:2. Within the above range, the strength and heat insulation performance of an aerogel may be secured with high efficiency, and contraction may be prevented during atmospheric pressure drying, thereby preventing degradation in heat insulation performance.

In the present disclosure, the silica concentration of the silica precursor composition may be 10 kg/m³ to 100 kg/m³, 20 kg/m³ to 80 kg/m³, 30 kg/m³ to 70 kg/m³, 30 kg/m³ to 60 kg/m³, or 35 kg/m³ to 45 kg/m³, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol becomes 0.1 wt % to 30 wt %, but is not limited thereto. When the content of the silica satisfies the above range, it is preferable in terms of securing mechanical physical properties, the flexibility in particular, of the aerogel composite at an excellent level while having the effect of improving heat insulation.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and an aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally produced while promoting a surface modification reaction.

In the present disclosure, in order to prepare a pre-hydrolyzed silica precursor when preparing the silica precursor composition, the silica precursor and an organic solvent may be mixed and prepared at a weight ratio of 1:0.1 to 1.5, 1:0.5 to 1.5, or 1:0.5 to 1.2, but are not limited thereto.

In addition, in the present disclosure, in order to prepare a pre-hydrolyzed silica precursor when preparing the silica precursor composition, the silica precursor and water may be mixed and prepared at a molar ratio of 1:0.1 to 10, 1:1 to 8, or 1:2 to 6, but are not limited thereto.

In addition, in the present disclosure, when a pre-hydrolyzed TEOS is included as a silica precursor when preparing the silica precursor composition, the pre-hydrolyzed TEOS and the organic solvent may be mixed at a weight ratio of 1:2 to 10, 1:3 to 8, or 1:3 to 6, but are not limited thereto.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and In some embodiments, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount which allows the pH of the sol to be 5 to 9. If the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, since the catalyst composition further includes an alkoxy silane-based compound having a hydrophobic group, the hydrophobic agent and the silica wet gel may react to strengthen the structure and perform surface modification.

In the present disclosure, the type of the alkoxy silane-based compound having a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane, but are not limited thereto.

In the present disclosure, the alkoxy silane-based compound having a hydrophobic group may be included in an amount of 3 parts by weight to 15 parts by weight, 5 parts by weight to 10 parts by weight, or 6 parts by weight to 8 parts by weight, based on 100 parts by weight of the silica sol, but is not limited thereto.

However, in the present disclosure, when the catalyst composition includes an alkoxy silane-based compound having a hydrophobic group, water may be included to promote a surface modification reaction. In the present disclosure, the catalyst composition of the present disclosure may include 3 equivalents to 8 equivalents, 4 equivalents to 8 equivalents, or 5 equivalents to 6 equivalents of water based on 1 equivalent of a hydrophobizing agent.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In the present disclosure, if necessary, an additive may be further added to the silica sol. At this time, all known additives which may be added when preparing an aerogel may be applied as the additive, and for example, an additive such as an opacifying agent and a flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, it is preferable in that the appropriate viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.7 to 1:1, but is not limited thereto.

In the present disclosure, the silica sol impregnated into the substrate may be subjected to gelation simultaneously with the impregnation process of the silica sol or sequentially after the impregnation process.

In the present disclosure, the substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the gelation may be performed under an atmosphere temperature of 20° C. to 40° C., 20° C. to 30° C., 25° C. to 40° C., 30° C. to 40° C., or 35° C. to 40° C., and the gelation time may be 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but is not limited thereto.

Aging of Wet Gel Composite, which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the wet gel composite, which has gelled, to stand as it is at an appropriate temperature, or may be performed by adding a cross-linking-promoting compound.

In addition, in the present disclosure, the aging step may be performed by adding a solution in which a base catalyst such as sodium hydroxide (NaOH), potassium hydroxide (KOH), ammonium hydroxide ($NH_4OH$), triethylamine, pyridine, or the like is diluted to a concentration of 1% to 10% in an organic solvent, in the presence of the wet gel composite. In this case, a Si—O—Si bonding in an aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In the present disclosure, the aging step may be performed by leaving the wet gel composite, which has gelled, to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the wet gel composite, which has gelled, at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, in the presence of a solution in which the base catalyst is diluted to a concentration of 1% to 10% in an organic solvent.

In addition, in the present disclosure, in the aging step (secondary aging if performed in two stages), a mixed solution of an alkoxy silane-based compound and an alcohol may be added to provide an additional sol precursor source as well as unreacted sol to induce additional gelation in the silica gel network structure, thereby further strengthening the gel structure. At this time, the alkoxy silane-based compound may be included in an amount of 0.5 parts by weight to 9.5 parts by weight, 1.0 part by weight to 9.5 parts by weight, or 1.5 parts by weight to 9.5 parts by weight based on the total 100 parts of the aging solution.

In the present disclosure, the alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, in the present disclosure, the alcohol may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, preferably a monohydric alcohol having 1 to 6 carbon atoms such as methanol, ethanol, isopropanol, and butanol, and may be, for example, ethanol, but is not limited thereto.

In the present disclosure, the aging step may be performed in a separate reaction vessel after recovering the wet gel composite which has gelled, or may be performed inside the reaction vessel in which the gelation step has been performed.

Surface Modification of Aged Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C., or 50° C. to 80° C. for 1 hour to 24 hours, but is not limited thereto.

Drying Step

In the present disclosure, a drying step of drying the surface-modified wet gel composite to obtain an aerogel composite may be included.

In the present disclosure, the drying is performed as a process of removing only the solvent while maintaining the pore structure of the aged gel, and may be performed, for example, by supercritical drying or atmospheric pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby producing an aerogel composite, but the present disclosure is not limited thereto.

In addition, in the present disclosure, the atmospheric pressure drying process may be performed according to a typical method such as hot air drying or IR drying at a temperature of 70° C. to 200° C. and under an atmospheric pressure (1±0.3 atm), but is not limited thereto.

In addition to the above process, the present disclosure includes acidification of a basic metal oxide precursor (e.g., sodium silicate) in water to prepare a hydrogel. A salt by-product may be removed from a silicic acid precursor by ion exchange and/or subsequent washing of the formed gel with water. Removing the water from pores of the gel may be performed through exchange with a polar organic solvent, such as ethanol, methanol, or acetone. Subsequently, the liquid phase in the gel is at least partially extracted using innovative processing and extraction techniques.

In addition to the above process, the present disclosure includes reducing damage capillary force at a solvent/pore interface by chemical transformation of a matrix material in a wet gel state through conversion of a surface hydroxyl group to hydrophobic trimethylsilylether, thereby enabling liquid phase extraction from a gel material at a temperature and a pressure below the critical point of the solvent.

In addition to the above process, in the present disclosure, a liquid (solvent) in the gel material is frozen at a lower temperature and a sublimation process is subsequently performed, so that the solvent may be removed from the gel material. Such removal or drying of the solvent from the gel material is understood to be within the scope of the present disclosure. Such removal largely preserves the gel structure, resulting in producing an aerogel with unique properties.

The aerogel composite provided in the present disclosure may be used as a heat insulation material, thermal insulation material, or non-combustible material for aircraft, ships, automobiles, electronic devices, and batteries, as well as for plant facilities for heat and cold insulation, such as piping or industrial furnaces of various industrial facilities.

In accordance with some embodiments of the present disclosure, a heat insulation member includes the aerogel composite provided in the present disclosure.

In the present disclosure, the heat insulation member may include the aerogel composite as described above, and a support member positioned on at least one surface of an upper surface or a lower surface of the aerogel composite.

In the present disclosure, the support member may be, for example, a film-like support member, a sheet-like support member, a foil-like support member, a porous support member, and the like.

In the present disclosure, the film-like support member is formed by molding a polymer raw material into a thin film, and examples thereof may include an organic film of such as PET and polyimide, a glass film, and the like (including a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the thickness of the support member is not particularly limited, and may be, for example, 0.1 m to 100 m, or 1 m to 50 m.

In the present disclosure, the heat insulation member may also be applied to applications such as a heat insulation material, thermal insulation material, or non-combustible material in the construction field, aviation field, automobile field, batteries, home appliances, semiconductor field, industrial facilities, and the like.

Hereinafter, the present disclosure will be described in detail with reference to the following examples. However, the following examples are illustrative of the present disclosure, and the contents of the present disclosure are not limited by the following Examples.

EXAMPLES

Example 1

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:6 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.177 g/cc.

Example 2

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:4 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 0.7:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.187 g/cc.

Example 3

Methyltriethoxysilane (MTES) and TEOS were mixed in a molar ratio of 97:3 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with the silica sol was added to prepare a catalyzed silica sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.5:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. Thereafter, the wet gel composite which has gelled was added with 109 vol % of a solution, which was obtained by diluting ammonia water in ethanol (2.4 wt %), based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.170 g/cc.

Example 4

Methyltriethoxysilane (MTES) and TEOS were mixed in a molar ratio of 97:3 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with the silica sol was added to prepare a catalyzed silica sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.7:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. Thereafter, the wet gel composite which was gelled was added with 109 vol % of a solution, which was obtained by diluting ammonia water in ethanol (2.4 wt %), based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.190 g/cc.

Example 5

Methyltriethoxysilane (MTES) and TEOS were mixed in a molar ratio of 97:3 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with the silica sol was added to prepare a catalyzed silica sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.7:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. Thereafter, the wet gel composite which was gelled was added with 109 vol % of a solution as an aging solution, which was obtained by diluting 2.4 wt % of trimethylethoxysilane (TMES) in ethanol, based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the condi-

Example 6

Methyltriethoxysilane (MTES) and TEOS were mixed in a molar ratio of 97:3 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. A base catalyst solution (10 wt % of NaOH aqueous solution) having a volume ratio of 99:1 with the silica sol was added to prepare a catalyzed silica sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. Thereafter, the wet gel composite which was gelled was added with 109 vol % of a solution as an aging solution, which was obtained by diluting 2.4 wt % of trimethylethoxysilane (TMES) in ethanol, based on the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.206 g/cc.

Example 7

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:4 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 0.7:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 50 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 1 hour. The aged wet gel composite was added with 90 vol % of a solution (2 vol %) as a surface modifier, which was obtained by diluting trimethylethoxysilane(TMES) in ethanol, based on the volume of the wet gel composite, and then was subjected to surface modification at a temperature of 75° C. for 2 hours. Thereafter, supercritical drying was performed under the conditions of $CO_2$ 150 bar and 70° C. to produce an aerogel composite having a density of about 0.189 g/cc.

Example 8

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:6 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 0.7:1 (catalyzed silica sol:fiber). The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 50 minutes. Thereafter, the wet gel composite which was gelled was added with 109 vol % of a solution, which was prepared by diluting 2.9 wt % of methyltriethoxysilane (MTES) in ethanol with a water content of 10 wt %, based on the volume of the volume of the wet gel composite to be subjected to secondary aging in an oven at 75° C. for 1 hour. The aged wet gel composite was added with 90 vol % of a solution (2 vol %) as a surface modifier, which was obtained by diluting trimethylethoxysilane(TMES) in ethanol, based on the volume of the wet gel composite, and then was subjected to surface modification at a temperature of 75° C. for 2 hours. Thereafter, supercritical drying was performed under the conditions of $CO_2$ 150 bar and 70° C. to produce an aerogel composite having a density of about 0.192 g/cc.

Comparative Example 1

A pre-hydrolyzed TEOS (silica content: 20 wt %, HTEOS), ethanol, and distilled water were respectively added at a weight ratio of 1:2:0.22 and then mixed to prepare a silica precursor composition. Ethanol, NaOH (5 wt % of aqueous solution), and trimethylethoxysilane (TMES) were respectively added at a weight ratio of 1:0.3:1 and then mixed to prepare a catalyst composition. In a reactor, the silica precursor composition and the catalyst composition prepared above were mixed at a volume ratio of 9:1 to prepare a catalyzed silica sol. A fiber (a glass fiber mat, 10 mm) as a substrate was passed through to infiltrate the catalyzed sol into the fiber, wherein the catalyzed silica sol was impregnated at a volume ratio of 1:1 (catalyzed silica sol:glass fiber mat) with respect to the volume of the glass fiber mat, followed by performing gelation thereon 10 minutes later to prepare a wet gel composite. The fiber which passed through the impregnation tank to be infiltrated with the catalyzed sol was left to stand at room temperature for 24 hours to be subjected to gelation, aging, and surface modification. Thereafter, supercritical drying was performed under the conditions of $CO_2$ 150 bar and 70° C. to produce an aerogel composite having a density of about 0.206 g/cc.

Comparative Example 2

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:4 with the hydrated TEOS solution was added to prepare a silica sol. A base catalyst solution (5 wt % of NaOH aqueous solution) having a volume ratio of 99:1 with the silica sol was added to prepare a catalyzed sol. A fiber (a glass fiber mat, 10 mm) as a substrate was passed through to infiltrate the catalyzed sol into the fiber, wherein the catalyzed silica sol was impregnated at a volume ratio of 0.3:1 (catalyzed silica sol:glass fiber mat) with respect to the volume of the glass fiber mat, followed by performing gelation thereon 10 minutes later to prepare a wet gel composite. The fiber which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. Thereafter, the wet gel composite which was gelled was left to stand in a chamber of 70° C. for 24 hours to be aged. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. Thereafter, supercritical drying was performed under the conditions of $CO_2$ 150 bar and 70° C. to produce an aerogel composite having a density of about 0.142 g/cc.

Comparative Example 3

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an acid was added such that the pH of the silica precursor solution was 3 or less and stirred for 2 hours or more to prepare a hydrated TEOS solution. Ethanol having a weight ratio of 1:4 with the hydrated TEOS solution was added to prepare a silica sol. A base catalyst solution (5 wt % of NaOH aqueous solution) having a volume ratio of 99:1 with the silica sol was added to prepare a catalyzed sol. A fiber (a glass fiber mat, 3 mm) as a substrate was passed through to infiltrate the catalyzed sol into the fiber, wherein the catalyzed silica sol was impregnated at a volume ratio of 0.5:1 (catalyzed silica sol:glass fiber mat) with respect to the volume of the glass fiber mat, followed by performing gelation thereon 10 minutes later to prepare a wet gel composite. The fiber which passed through the impregnation tank to allow the catalyzed sol to infiltrate thereinto was gelled at room temperature for 10 minutes while moving on a conveyor belt at a predetermined rate. After the gelation was completed, stabilization was performed at room temperature (25° C.) for 10 minutes, and then primary aging was performed in an oven at 70° C. for 50 minutes. Thereafter, a mixture of ethanol and ammonia water (volume ratio of 98:2) was prepared and added to the wet gel composite which was gelled in an amount of 1.6 times the volume of the silica sol, and then secondary aging was performed in an oven at 70° C. for 1 hour. Thereafter, supercritical drying was performed under the conditions of $CO_2$ 150 bar and 70° C. to produce an aerogel composite having a density of about 0.168 g/cc.

Experimental Example 1 Measurement of Density and Pore Size-Specific Distribution 1. Density For the silica aerogel composite produced in each of Examples and Comparative Examples, five specimens having a size of 10 cm×10 cm were prepared, and then the weight of each specimen was measured, and the thickness of each specimen was measured using HFM 436 equipment of NETZSCH Co., Ltd. The measured weight and thickness, and the size were used to calculate the density, and the average density of the five specimens was determined as the final density, and the results are shown in Table 1 below.

2. Volume Ratio (%) of Effective Pores with Pore Diameter of 30 nm or less.

For the silica aerogel composite produced in each of Examples and Comparative Examples, the amount of nitrogen absorption/desorption according to partial pressure (0.11<p/p0<1) was analyzed using the ASAP 2010 equipment of Micrometrics Co., Ltd. The volume ratio of pores (effective pores) having a pore diameter in the numerical range of 30 nm or less in the measured pore volume was calculated, and the results are shown in Table 1 below.

TABLE 1

| Classifications | Density (g/cc) | Effective pore volume ratio (%) |
| --- | --- | --- |
| Example 1 | 0.177 | 35.6 |
| Example 2 | 0.187 | 31.1 |
| Example 3 | 0.170 | 40.2 |
| Example 4 | 0.190 | 38.7 |
| Example 5 | 0.211 | 33.8 |
| Example 6 | 0.206 | 37.2 |
| Example 7 | 0.189 | 30.3 |
| Example 8 | 0.192 | 37.3 |
| Comparative Example 1 | 0.206 | 22.0 |
| Comparative Example 2 | 0.142 | 20.9 |
| Comparative Example 3 | 0.168 | 20.1 |

Experimental Example 2 Measurement of Recovery Rate and Heat Transmission Coefficient after Compression of Aerogel Composite 1. Compression Recovery Rate Specimens each having a size of 20 cm×20 cm were prepared respectively using the aerogel composites obtained in Examples and Comparative Examples. Here, if the size in width or length of the produced aerogel composite is less than 20 cm, two or more specimens may be re-arranged side by side so that the size of the specimens becomes 20 cm×20 cm, and thereafter measurement may be performed with respect to the specimens. Each of the prepared specimens was then compressed for 10 minutes under respective pressure conditions using the QM900A-15T press equipment of QMESYS Co., Ltd. The thickness of each of the aerogel composites was measured using the HFM436 equipment of Netzsch Co., Ltd., before the compression and 1 hour after the completion of the compression, and the compression recovery rate was calculated according to Equation 1 below, and the results are shown in Table 2 below. However, a pressure value shown in Table 2 below is a value of pressure applied per unit area of a specimen, and means a value obtained by multiplying a cylinder area of the press equipment by a set pressure value and dividing the product by the area of the specimen. The cylinder radius of the QM900A-15T press equipment used in the present experiment is 6.25 cm, and the cylinder size is 12.5 cm.

Compression recovery rate (%)={(Cross-sectional thickness of aerogel composite after compression)/(Cross-sectional thickness of aerogel composite before compression)}×100   [Equation 1]

Actual pressure value=(Radius (cm) of inner diameter of cylinder of press equipment×Radius (cm) of inner diameter of cylinder of press equipment×3.14×set pressure value)/(Area of specimen(cm$^2$))   [Equation 2]

2. Heat Transmission Coefficient

The experiment was performed in the same manner as in 1 above, and the thermal conductivity of each of the aerogel composites was measured using the HFM436 equipment of Netzsch Co., Ltd., before the compression and 1 hour after the completion of the compression, and then the heat transmission coefficient was calculated, and the increase rate of the heat transmission coefficient compared to that before the compression was evaluated, and the results are shown in Table 3 below.

In addition, in order to confirm the degree of change in the heat transmission coefficient after the compression, the average value (b) of the heat transmission coefficients measured after the compression with a pressure of 9 bar to 30 bar was calculated, and as shown in Equation 3 below, the difference between the heat transmission coefficient (a) measured after compression with a pressure of 9 bar to 30 bar and the average value (b), and A, which is the value obtained by dividing the difference by the average value (b) of the heat transmittance coefficients, was calculated, and the results are shown in Table 4.

(Heat transmission coefficient (a) after compression−Average value (b) of heat transmission coefficients after compression)(Average value (b) of heat transmission coefficients after compression)×A   [Equation 3]

Each result value shown in Tables 2 to 4 below is rounded from three decimal places and expressed to two decimal places.

TABLE 2

| Classifications | Pressure condition | Thickness after compression (mm) | Compression recovery rate (%) |
|---|---|---|---|
| Example 1 | — | 10.4 | — |
| | 3 bar, 10 min | 9.1 | 87.50 |
| | 9 bar, 10 min | 8.2 | 78.85 |
| | 15 bar, 10 min | 8.0 | 76.92 |
| | 24 bar, 10 min | 8.1 | 77.88 |
| | 30 bar, 10 min | 7.9 | 75.96 |
| | 33 bar, 10 min | 8.0 | 76.92 |
| Example 2 | — | 8.6 | — |
| | 3 bar, 10 min | 8.2 | 95.35 |
| | 9 bar, 10 min | 8.0 | 93.02 |
| | 15 bar, 10 min | 7.9 | 91.86 |
| | 24 bar, 10 min | 7.7 | 89.53 |
| | 30 bar, 10 min | 7.4 | 86.05 |
| | 33 bar, 10 min | 6.9 | 80.23 |
| Example 3 | — | 3.6 | — |
| | 3 bar, 10 min | 3.4 | 94.44 |
| | 9 bar, 10 min | 3.3 | 91.67 |
| | 15 bar, 10 min | 3.2 | 88.89 |
| | 24 bar, 10 min | 3.2 | 88.89 |
| | 30 bar, 10 min | 3.1 | 86.11 |
| | 33 bar, 10 min | 3.0 | 83.33 |
| Example 4 | — | 4.6 | — |
| | 3 bar, 10 min | 4.4 | 95.65 |
| | 9 bar, 10 min | 4.4 | 95.65 |
| | 15 bar, 10 min | 4.2 | 91.30 |
| | 24 bar, 10 min | 4.1 | 89.13 |
| | 30 bar, 10 min | 4.0 | 86.96 |
| | 33 bar, 10 min | 3.9 | 84.78 |
| Example 5 | — | 4.7 | — |
| | 3 bar, 10 min | 4.6 | 97.87 |
| | 9 bar, 10 min | 4.2 | 89.36 |
| | 15 bar, 10 min | 4.2 | 89.36 |
| | 24 bar, 10 min | 4.1 | 87.23 |
| | 30 bar, 10 min | 4.1 | 87.23 |
| | 33 bar, 10 min | 4.0 | 85.11 |
| Example 6 | — | 5.0 | — |
| | 3 bar, 10 min | 4.6 | 92.00 |
| | 9 bar, 10 min | 3.9 | 78.00 |
| | 15 bar, 10 min | 3.7 | 74.00 |
| | 24 bar, 10 min | 3.7 | 74.00 |
| | 30 bar, 10 min | 3.6 | 72.00 |
| | 33 bar, 10 min | 3.6 | 72.00 |
| Example 7 | — | 2.7 | — |
| | 3 bar, 10 min | 2.6 | 96.30 |
| | 9 bar, 10 min | 2.5 | 92.59 |
| | 15 bar, 10 min | 2.5 | 92.59 |
| | 24 bar, 10 min | 2.4 | 88.89 |
| | 30 bar, 10 min | 2.3 | 85.19 |
| | 33 bar, 10 min | 2.3 | 85.19 |
| Example 8 | — | 2.7 | — |
| | 3 bar, 10 min | 2.7 | 100.00 |
| | 9 bar, 10 min | 2.6 | 96.30 |
| | 15 bar, 10 min | 2.6 | 96.30 |
| | 24 bar, 10 min | 2.5 | 92.59 |
| | 30 bar, 10 min | 2.5 | 92.59 |
| | 33 bar, 10 min | 2.4 | 88.89 |
| Comparative Example 1 | — | 9.5 | — |
| | 3 bar, 10 min | 6.0 | 63.16 |
| | 9 bar, 10 min | 5.0 | 52.63 |
| | 15 bar, 10 min | 4.8 | 50.53 |
| | 24 bar, 10 min | 4.7 | 49.47 |
| | 30 bar, 10 min | 4.9 | 51.58 |
| | 33 bar, 10 min | 5.0 | 52.63 |
| Comparative Example 2 | — | 6.3 | — |
| | 3 bar, 10 min | 4.4 | 69.84 |
| | 9 bar, 10 min | 3.7 | 58.73 |
| | 15 bar, 10 min | 3.3 | 52.38 |
| | 24 bar, 10 min | 3.1 | 49.21 |
| | 30 bar, 10 min | 2.9 | 46.03 |
| | 33 bar, 10 min | 2.9 | 46.03 |
| Comparative Example 3 | — | 2.6 | — |
| | 3 bar, 10 min | 1.7 | 65.38 |
| | 9 bar, 10 min | 1.5 | 57.69 |
| | 15 bar, 10 min | 1.4 | 53.85 |
| | 24 bar, 10 min | 1.1 | 42.31 |
| | 30 bar, 10 min | 1.0 | 38.46 |
| | 33 bar, 10 min | 0.9 | 34.62 |

TABLE 3

| Classifications | Pressure condition | Heat transmission coefficient (W/m²K) | Heat transmission coefficient increase rate (Times) |
|---|---|---|---|
| Example 1 | — | 2.26 | — |
| | 3 bar, 10 min | 2.59 | 1.15 |
| | 9 bar, 10 min | 2.89 | 1.28 |
| | 15 bar, 10 min | 3.05 | 1.35 |
| | 24 bar, 10 min | 3.09 | 1.37 |
| | 30 bar, 10 min | 3.19 | 1.41 |
| | 33 bar, 10 min | 3.24 | 1.43 |
| Example 2 | — | 2.42 | — |
| | 3 bar, 10 min | 2.55 | 1.05 |
| | 9 bar, 10 min | 2.66 | 1.10 |
| | 15 bar, 10 min | 2.75 | 1.14 |
| | 24 bar, 10 min | 2.87 | 1.19 |
| | 30 bar, 10 min | 3.04 | 1.26 |
| | 33 bar, 10 min | 3.29 | 1.36 |
| Example 3 | — | 6.42 | — |
| | 3 bar, 10 min | 6.85 | 1.07 |
| | 9 bar, 10 min | 7.18 | 1.12 |
| | 15 bar, 10 min | 7.44 | 1.16 |
| | 24 bar, 10 min | 7.47 | 1.16 |
| | 30 bar, 10 min | 7.74 | 1.21 |
| | 33 bar, 10 min | 8.07 | 1.26 |
| Example 4 | — | 4.30 | — |
| | 3 bar, 10 min | 4.55 | 1.06 |
| | 9 bar, 10 min | 4.66 | 1.08 |
| | 15 bar, 10 min | 5.14 | 1.19 |
| | 24 bar, 10 min | 5.29 | 1.23 |
| | 30 bar, 10 min | 5.53 | 1.28 |
| | 33 bar, 10 min | 5.72 | 1.33 |
| Example 5 | — | 4.26 | — |
| | 3 bar, 10 min | 4.43 | 1.04 |
| | 9 bar, 10 min | 4.93 | 1.16 |
| | 15 bar, 10 min | 4.98 | 1.17 |
| | 24 bar, 10 min | 5.12 | 1.20 |
| | 30 bar, 10 min | 5.15 | 1.21 |
| | 33 bar, 10 min | 5.33 | 1.25 |
| Example 6 | — | 3.16 | — |
| | 3 bar, 10 min | 3.48 | 1.10 |
| | 9 bar, 10 min | 4.49 | 1.42 |
| | 15 bar, 10 min | 4.92 | 1.56 |
| | 24 bar, 10 min | 4.89 | 1.55 |
| | 30 bar, 10 min | 5.00 | 1.58 |
| | 33 bar, 10 min | 5.39 | 1.71 |
| Example 7 | — | 6.93 | — |
| | 3 bar, 10 min | 7.27 | 1.05 |
| | 9 bar, 10 min | 7.60 | 1.10 |
| | 15 bar, 10 min | 7.60 | 1.10 |
| | 24 bar, 10 min | 7.96 | 1.15 |
| | 30 bar, 10 min | 8.30 | 1.20 |
| | 33 bar, 10 min | 8.39 | 1.21 |
| Example 8 | — | 8.85 | — |
| | 3 bar, 10 min | 8.89 | 1.00 |
| | 9 bar, 10 min | 9.23 | 1.04 |
| | 15 bar, 10 min | 9.27 | 1.05 |
| | 24 bar, 10 min | 9.88 | 1.12 |
| | 30 bar, 10 min | 10.00 | 1.13 |
| | 33 bar, 10 min | 10.46 | 1.18 |
| Comparative Example 1 | — | 1.84 | — |
| | 3 bar, 10 min | 2.73 | 1.48 |
| | 9 bar, 10 min | 3.44 | 1.87 |
| | 15 bar, 10 min | 4.38 | 2.38 |
| | 24 bar, 10 min | 5.64 | 3.07 |
| | 30 bar, 10 min | 5.57 | 3.03 |
| | 33 bar, 10 min | 5.65 | 3.07 |
| Comparative Example 2 | — | 3.89 | — |
| | 3 bar, 10 min | 6.09 | 1.57 |
| | 9 bar, 10 min | 8.51 | 2.19 |
| | 15 bar, 10 min | 9.97 | 2.56 |
| | 24 bar, 10 min | 10.94 | 2.81 |
| | 30 bar, 10 min | 11.76 | 3.02 |
| | 33 bar, 10 min | 11.83 | 3.04 |
| Comparative Example 3 | — | 9.38 | — |
| | 3 bar, 10 min | 16.29 | 1.74 |
| | 9 bar, 10 min | 20.73 | 2.21 |
| | 15 bar, 10 min | 23.00 | 2.45 |
| | 24 bar, 10 min | 29.55 | 3.15 |
| | 30 bar, 10 min | 33.10 | 3.53 |
| | 33 bar, 10 min | 36.89 | 3.93 |

TABLE 4

| Classifications | Pressure condition | Heat transmission coefficient (W/m²K) | Average value of heat transmission coefficients after compression (W/m²K) | Deviation of heat transmission coefficient after compression (W/m²K) | Deviation of heat transmission coefficients after compression/average value of heat transmission coefficients (A) |
|---|---|---|---|---|---|
| Example 1 | 9 bar, 10 min | 2.89 | 3.05 | −0.16 | −0.05 |
| | 15 bar, 10 min | 3.05 | | 0.00 | 0.00 |
| | 24 bar, 10 min | 3.09 | | 0.04 | 0.01 |
| | 30 bar, 10 min | 3.19 | | 0.14 | 0.05 |
| Example 2 | 9 bar, 10 min | 2.66 | 2.83 | −0.17 | −0.06 |
| | 15 bar, 10 min | 2.75 | | −0.08 | −0.03 |
| | 24 bar, 10 min | 2.87 | | 0.04 | 0.01 |
| | 30 bar, 10 min | 3.04 | | 0.21 | 0.07 |
| Example 3 | 9 bar, 10 min | 7.18 | 7.46 | −0.28 | −0.04 |
| | 15 bar, 10 min | 7.44 | | −0.02 | 0.00 |
| | 24 bar, 10 min | 7.47 | | 0.01 | 0.00 |
| | 30 bar, 10 min | 7.74 | | 0.28 | 0.04 |
| Example 4 | 9 bar, 10 min | 4.66 | 5.15 | −0.50 | −0.10 |
| | 15 bar, 10 min | 5.14 | | −0.01 | 0.00 |
| | 24 bar, 10 min | 5.29 | | 0.14 | 0.03 |
| | 30 bar, 10 min | 5.53 | | 0.37 | 0.07 |
| Example 5 | 9 bar, 10 min | 4.93 | 5.04 | −0.11 | −0.02 |
| | 15 bar, 10 min | 4.98 | | −0.07 | −0.01 |

TABLE 4-continued

| Classifications | Pressure condition | Heat transmission coefficient (W/m²K) | Average value of heat transmission coefficients after compression (W/m²K) | Deviation of heat transmission coefficient after compression (W/m²K) | Deviation of heat transmission coefficients after compression/average value of heat transmission coefficients (A) |
|---|---|---|---|---|---|
| | 24 bar, 10 min | 5.12 | | 0.08 | 0.02 |
| | 30 bar, 10 min | 5.15 | | 0.10 | 0.02 |
| Example 6 | 9 bar, 10 min | 4.49 | 4.83 | −0.34 | −0.07 |
| | 15 bar, 10 min | 4.92 | | 0.09 | 0.02 |
| | 24 bar, 10 min | 4.89 | | 0.06 | 0.01 |
| | 30 bar, 10 min | 5.00 | | 0.17 | 0.04 |
| Example 7 | 9 bar, 10 min | 7.60 | 7.87 | −0.27 | −0.03 |
| | 15 bar, 10 min | 7.60 | | −0.27 | −0.03 |
| | 24 bar, 10 min | 7.96 | | 0.09 | 0.01 |
| | 30 bar, 10 min | 8.30 | | 0.44 | 0.06 |
| Example 8 | 9 bar, 10 min | 9.23 | 9.60 | −0.36 | −0.04 |
| | 15 bar, 10 min | 9.27 | | −0.33 | −0.03 |
| | 24 bar, 10 min | 9.88 | | 0.29 | 0.03 |
| | 30 bar, 10 min | 10.00 | | 0.41 | 0.04 |
| Comparative Example 1 | 9 bar, 10 min | 3.44 | 4.76 | −1.32 | −0.28 |
| | 15 bar, 10 min | 4.38 | | −0.38 | −0.08 |
| | 24 bar, 10 min | 5.64 | | 0.88 | 0.19 |
| | 30 bar, 10 min | 5.57 | | 0.81 | 0.17 |
| Comparative Example 2 | 9 bar, 10 min | 8.51 | 10.29 | −1.78 | −0.17 |
| | 15 bar, 10 min | 9.97 | | −0.32 | −0.03 |
| | 24 bar, 10 min | 10.94 | | 0.64 | 0.06 |
| | 30 bar, 10 min | 11.76 | | 1.46 | 0.14 |
| Comparative Example 3 | 9 bar, 10 min | 20.73 | 26.59 | −5.86 | −0.22 |
| | 15 bar, 10 min | 23.00 | | −3.59 | −0.14 |
| | 24 bar, 10 min | 29.55 | | 2.95 | 0.11 |
| | 30 bar, 10 min | 33.10 | | 6.51 | 0.24 |

As shown in Tables 2 to 4 above, it was confirmed that the aerogel composites of Examples 1 to 8 produced according to the present disclosure had a high compression recovery rate compared to the aerogel composites of Comparative Examples 1 to 3, and had a significantly small degree of increase in heat transmission coefficient even after the compression, so that it was confirmed that the heat insulation performance was maintained at an excellent level even under high-pressure compression conditions.

From the results, it has been confirmed that the aerogel composite of the present disclosure has excellent elasticity, flexibility, and strength of pores, and thus, has excellent resilience even after high-pressure compression, and accordingly, it has been confirmed that sharp degradation in heat insulation performance caused by the destruction of pores, particularly, destruction of pores having a size of 30 nm or less, is prevented, and the heat insulation performance is maintained excellent even after the compression.

When applied as a heat insulation material for batteries, electronic devices, automobiles, industrial devices, structures, or the like, an aerogel composite provided in the present disclosure may maintain an excellent level of heat insulation properties without significant degradation even when compressed and deformed by a pressure applied to the aerogel composite due to expansion of various devices or structures positioned adjacent thereto, or other causes.

What is claimed is:

1. An aerogel composite comprising a fiber substrate, and an aerogel including one or more pores, wherein the aerogel composite is configured so that when the aerogel composite is compressed by application of pressure of 24 bar, 30 bar, and 33 bar in a transverse direction with respect to a cross-section of the aerogel composite, the heat transmission coefficient after the compression is equal to or less than three times the heat transmission coefficient before the compression, wherein a change rate (B) of heat transmission coefficient after compression per unit application pressure represented by Equation 4 below with respect to the aerogel composite is a rational number of from −0.100 to +0.100:

$$B = \text{(heat transmission coefficient after compression with a pressure of } x \text{ − heat transmission coefficient after compression with a pressure of } y)/(x-y) \quad \text{[Equation 4]}$$

wherein in Equation 4 above, x and y are independently a pressure value (unit bar) of any one of 9 bar, 15 bar, or 24 bar, and are different pressure values from each other.

2. The aerogel composite of claim 1, wherein when the aerogel composite is applied with a pressure of 3 bar in the transverse direction with respect to the cross-section of the aerogel composite, the heat transmission coefficient after the compression is 1.45 times or less the heat transmission coefficient before the compression.

3. The aerogel composite of claim 1, wherein when the aerogel composite is applied with a pressure of 9 bar in the transverse direction with respect to the cross-section of the aerogel composite, the heat transmission coefficient after the compression is equal to or less than 1.85 times the heat transmission coefficient before the compression.

4. The aerogel composite of claim 1, wherein when the aerogel composite is applied with a pressure of 15 bar in the transverse direction with respect to the cross-section of the aerogel composite, the heat transmission coefficient after the compression is equal to or less than 2.35 times the heat transmission coefficient before the compression.

5. The aerogel composite of claim 1, wherein when the aerogel composite is applied with a pressure of at least one of 9 bar, 15 bar, 24 bar, 30 bar, or 33 bar in the transverse direction with respect to the cross-section of the aerogel composite, the compression recovery rate represented by Equation 1 below is 60% or greater:

Compression recovery rate (%)={(Cross-sectional thickness of aerogel composite after compression)/(Cross-sectional thickness of aerogel composite before compression)}×100      [Equation 1].

6. The aerogel composite of claim 1, wherein the heat transmission coefficient obtained after compressing the aerogel composite with a pressure of 9 bar, 15 bar, 24 bar, and 30 bar satisfies Equation 3 below:

(Heat transmission coefficient ($a$) after compression−Average value ($b$) of heat transmission coefficients after compression)=(Average value ($b$) of heat transmission coefficients after compression)×$A$      [Equation 3]

wherein, the heat transmission coefficient (a) after compression is a heat transmission coefficient obtained after performing compression with a pressure of any one pressure value of 9 bar, 15 bar, 24 bar, or 30 bar in the transverse direction with respect to a cross-section of the aerogel composite;

the average value (b) of heat transmission coefficients after compression is an average value of heat transmission coefficients obtained after performing compression with a pressure of each of 9 bar, 15 bar, 24 bar, and 30 bar in the transverse direction with respect to the cross-section of the aerogel composite; and A is a rational number of from −0.15 to +0.15.

7. The aerogel composite of claim 1, wherein the aerogel comprises pores having a pore diameter of 30 nm or less at 30% to 45% of pore volume of a framework structure of the aerogel.

8. The aerogel composite of claim 1, wherein the aerogel composite has a density of 0.05 g/cm³ to 0.50 g/cm³.

9. The aerogel composite of claim 1, wherein the aerogel is a silica aerogel.

10. The aerogel composite of claim 2, wherein the heat transmission coefficient after the compression is equal to or 1.45 times or less the heat transmission coefficient before the compression.

11. The aerogel composite of claim 3, wherein the heat transmission coefficient after the compression is equal to or 1.85 times or less the heat transmission coefficient before the compression.

12. The aerogel composite of claim 4, wherein the heat transmission coefficient after the compression is equal to or 2.35 times or less the heat transmission coefficient before the compression.

13. The aerogel composite of claim 5, wherein the compression recovery rate represented by Equation 1 is from 60% to 99%.

14. The aerogel composite of claim 7, wherein the pore diameter is from 0.1 nm to 30 nm.

15. The aerogel composite of claim 1, wherein the heat transmission coefficient after the compression is measured after one hour after the completion of the compression.

16. The aerogel composite of claim 6, wherein the heat transmission coefficient after the compression is measured after one hour after the completion of the compression.

17. A heat insulation member comprising the aerogel composite of claim 1.

18. The heat insulation member of claim 17, further comprising a support member positioned on at least one surface of an upper surface or a lower surface of the aerogel composite.

* * * * *